(12) United States Patent
Thirumalai et al.

(10) Patent No.: US 9,979,970 B2
(45) Date of Patent: May 22, 2018

(54) SYSTEM AND METHOD FOR DETERMINING BUFFER FULLNESS FOR DISPLAY STREAM COMPRESSION

(71) Applicant: QUALCOMM Incorporated, San Diego, CA (US)

(72) Inventors: Vijayaraghavan Thirumalai, San Diego, CA (US); Natan Haim Jacobson, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 14/820,404

(22) Filed: Aug. 6, 2015

(65) Prior Publication Data

US 2016/0044317 A1 Feb. 11, 2016

Related U.S. Application Data

(60) Provisional application No. 62/035,349, filed on Aug. 8, 2014.

(51) Int. Cl.
| | |
|---|---|
| *H04N 19/152* | (2014.01) |
| *H04N 19/119* | (2014.01) |
| *H04N 19/176* | (2014.01) |
| *H04N 19/124* | (2014.01) |
| *H04N 19/174* | (2014.01) |

(52) U.S. Cl.
CPC ......... *H04N 19/152* (2014.11); *H04N 19/119* (2014.11); *H04N 19/124* (2014.11); *H04N 19/174* (2014.11); *H04N 19/176* (2014.11)

(58) Field of Classification Search
CPC .. H04N 19/152; H04N 19/119; H04N 19/124; H04N 19/174; H04N 19/176
See application file for complete search history.

(56) References Cited

U.S. PATENT DOCUMENTS

| | | | | |
|---|---|---|---|---|
| 5,619,711 A | * | 4/1997 | Anderson | G06F 7/483 708/130 |
| 5,701,159 A | * | 12/1997 | Ohira | H04N 19/61 375/240.03 |
| 6,075,768 A | * | 6/2000 | Mishra | H04L 47/10 370/229 |
| 6,408,104 B1 | * | 6/2002 | Lim | H04N 19/86 375/E7.19 |

(Continued)

FOREIGN PATENT DOCUMENTS

| | | |
|---|---|---|
| EP | 2667603 A1 | 11/2013 |
| KR | 20080068276 A | 7/2008 |

OTHER PUBLICATIONS

International Search Report and Written Opinion—PCT/US2015/044252—ISA/EPO—dated Oct. 12, 2015.

*Primary Examiner* — Joseph Suh
(74) *Attorney, Agent, or Firm* — Knobbe, Martens, Olson & Bear, LLP

(57) ABSTRACT

In one example, there is provided a method that includes coding a block within a slice of video data. The slice may comprise one or more blocks of the video data. The method further includes storing bits corresponding to the block in a buffer, determining information indicative of a position of the block within the slice, and determining fullness of the buffer based at least in part on the position of the block within the slice.

26 Claims, 7 Drawing Sheets

(56) References Cited

U.S. PATENT DOCUMENTS

| | | | |
|---|---|---|---|
| 7,876,821 B2* | 1/2011 | Li | H04N 19/159 |
| | | | 375/240.12 |
| 8,165,202 B1 | 4/2012 | Yonemoto et al. | |
| 2002/0012395 A1* | 1/2002 | Song | H04N 19/197 |
| | | | 375/240.03 |
| 2002/0141503 A1 | 10/2002 | Kobayashi et al. | |
| 2003/0058947 A1* | 3/2003 | Peterson | H04N 5/147 |
| | | | 375/240.24 |
| 2005/0074061 A1* | 4/2005 | Ribas-Corbera | H04N 19/00 |
| | | | 375/240.01 |
| 2005/0254717 A1 | 11/2005 | Kalevo et al. | |
| 2006/0056518 A1 | 3/2006 | Conklin | |
| 2006/0062301 A1 | 3/2006 | Sung | |
| 2006/0097897 A1* | 5/2006 | Chi | H03M 7/40 |
| | | | 341/67 |
| 2006/0165170 A1 | 7/2006 | Kim et al. | |
| 2006/0262848 A1* | 11/2006 | Togita | H04N 19/61 |
| | | | 375/240.03 |
| 2006/0274827 A1* | 12/2006 | Aoyagi | G11B 20/10527 |
| | | | 375/240.01 |
| 2007/0025631 A1 | 2/2007 | Kim et al. | |
| 2007/0088666 A1* | 4/2007 | Saito | G06F 3/0613 |
| 2007/0098282 A1* | 5/2007 | Kubota | H04N 19/176 |
| | | | 382/239 |
| 2008/0101461 A1* | 5/2008 | Person | H03M 7/30 |
| | | | 375/240.02 |
| 2008/0168219 A1* | 7/2008 | Molaro | G06F 11/1435 |
| | | | 711/112 |
| 2009/0116555 A1 | 5/2009 | Oishi | |
| 2010/0027617 A1* | 2/2010 | Lee | H04N 19/176 |
| | | | 375/240.01 |
| 2010/0061645 A1 | 3/2010 | Wilkins et al. | |
| 2010/0128996 A1* | 5/2010 | Lee | H04N 19/152 |
| | | | 382/238 |
| 2012/0002723 A1* | 1/2012 | Arakawa | H04N 19/597 |
| | | | 375/240.03 |
| 2012/0236936 A1 | 9/2012 | Segall et al. | |
| 2012/0281767 A1* | 11/2012 | Duenas | H04N 19/176 |
| | | | 375/240.24 |
| 2012/0311171 A1 | 12/2012 | Holley et al. | |
| 2013/0053040 A1* | 2/2013 | Ebara | H04W 36/02 |
| | | | 455/436 |
| 2013/0089141 A1* | 4/2013 | Srinivasamurthy | H04N 19/172 |
| | | | 375/240.03 |
| 2013/0107961 A1* | 5/2013 | Yamori | H04N 19/112 |
| | | | 375/240.16 |
| 2014/0189105 A1* | 7/2014 | Takenaka | H04L 69/16 |
| | | | 709/224 |
| 2015/0049807 A1 | 2/2015 | Gu et al. | |
| 2015/0358111 A1* | 12/2015 | Marinier | H04L 1/0003 |
| | | | 370/329 |
| 2016/0182195 A1* | 6/2016 | Cheng | H04L 25/0204 |
| | | | 370/329 |

* cited by examiner

SYSTEM AND METHOD FOR DETERMINING BUFFER FULLNESS FOR DISPLAY STREAM COMPRESSION

INCORPORATION BY REFERENCE TO PRIORITY APPLICATION(S)

This application claims the benefit of U.S. Provisional Application No. 62/035,349, filed Aug. 8, 2014. Any and all applications for which a foreign or domestic priority claim is identified in the Application Data Sheet as filed with the present application are hereby incorporated by reference under 37 CFR 1.57.

TECHNICAL FIELD

This disclosure relates to the field of video coding and compression, and particularly to video compression for transmission over display links, such as display link video compression.

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed Display Stream Compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, there is provided a method of display link video compression that comprises coding a block within a slice of video data, the slice comprising one or more blocks of the video data, storing bits corresponding to the block in a buffer, determining information indicative of a position of the block within the slice, and determining fullness of the buffer based at least in part on the position of the block within the slice.

In another aspect, an apparatus for display link video compression comprises a processor configured to code a block of a slice of video data, the slice comprising one or more blocks of the video data, a buffer configured to store bits corresponding to the block, and a processor operatively coupled to the video coding device and the buffer. The processor is further configured to determine information indicative of a position of the block within the slice and determine fullness of the buffer based at least in part on the position of the block within the slice.

In another aspect, a non-transitory computer readable storage medium contains instructions that, when executed, cause a processor of a device to code a block within a slice of video data, the slice comprising one or more blocks of video data, store bits corresponding to the block in a buffer, determine information indicative of a position of the block within the slice, and determine fullness of the buffer based at least in part on the position of the block within the slice.

In another aspect, there is provided a video coding device that includes means for coding a block within a slice of video data, the slice comprising one or more blocks of the video data, means for storing bits corresponding to the block in a buffer, means for determining information indicative of a position of the block within the slice, and means for determining fullness of the buffer based at least in part on the position of the block within the slice.

DETAILED DESCRIPTION

Figure 1A:
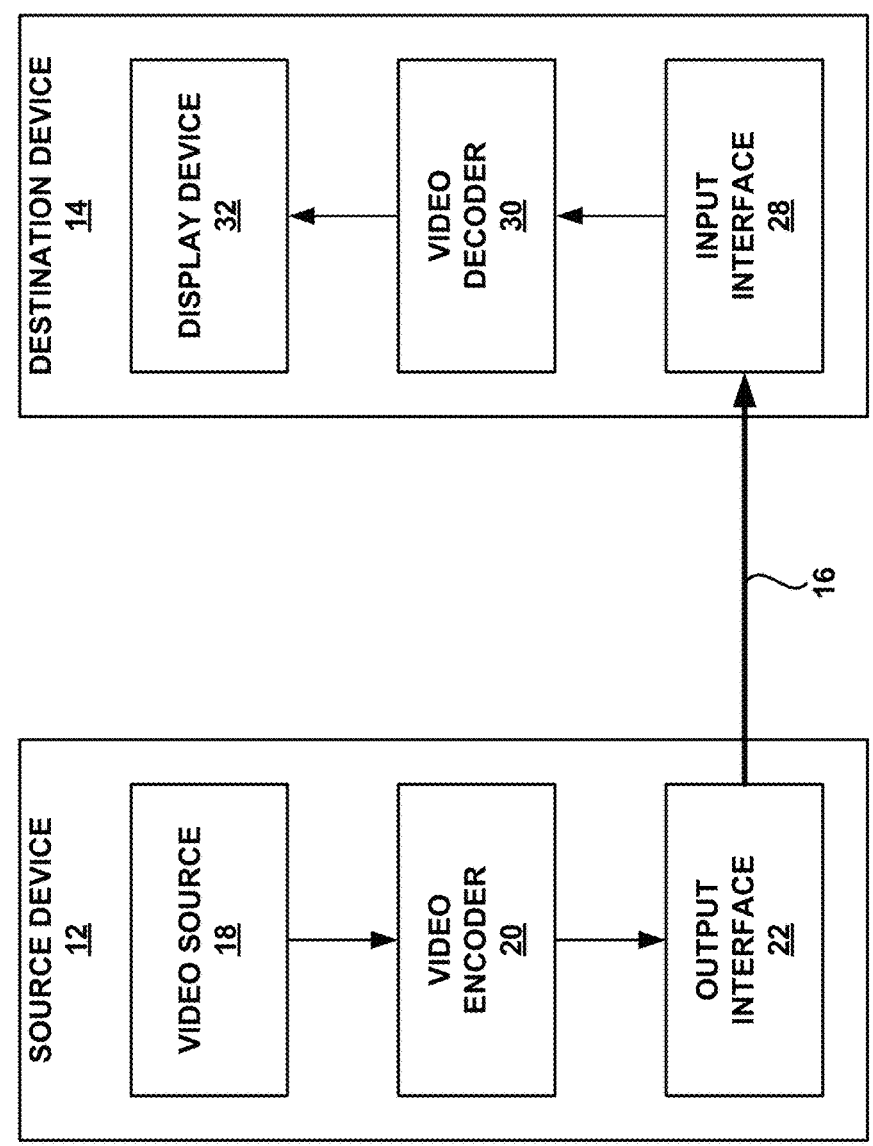
FIG. 1A is a block diagram illustrating an example video encoding and decoding system that may utilize techniques in accordance with aspects described in this disclosure.

In general, this disclosure relates to methods of improving video compression techniques such as those utilized in display link video compression. More specifically, the present disclosure relates to systems and methods for providing constant bit rate (CBR) output and/or input of a buffer (e.g., a rate buffer) for display link video compression.

In conventional display technology, 3:1 compression as provided by the Display Stream Compression (DSC) v1.0 solution by the Video Electronics Standards Association (VESA), which is an example of display link video compression, may be insufficient to drive future mobile market requirements, especially for requirements associated with high resolution displays such as 4K resolution (also referred to as 4K). Therefore, to meet future demands, it is desirable to develop a methodology for incorporation into, for example, a next generation DSC standard that provides 4:1 compression and above.

In this context, it is desirable to manage rate control in determining the performance of the DSC methodology. One purpose of rate control is to determine a set of coding parameters, such as a quantization parameter (QP), a coding mode etc., that satisfies instantaneous and average constraints on rate while maximizing rate-distortion performance.

The bits spent on encoding (i.e., the bits utilized to encode) each block of video data can vary substantially based on the properties (e.g., size, number of bits, etc.) of the block. Therefore, a buffer may be used as a part of the rate control mechanism in order to smooth the rate variations in the output bit stream. In the CBR buffer model, bits may be removed from the buffer at a constant rate during transmission of data over a wired physical link. In such a buffer model, if the encoder adds too many bits relative to the bits removed from the buffer, the number of bits in the buffer may exceed the capacity of the buffer, causing overflow. On the other hand, the encoder should add bits at a sufficient rate in order to prevent underflow. On the decoder side, the bits are added to the buffer at a constant rate and the decoder removes a variable number of bits for each block. To ensure proper decoding, the buffer should not underflow or overflow at any point during the decoding of the compressed bitstream.

Let a variable BufferCurrentSize represent the number of bits currently stored within a buffer and a variable BufferMaxSize represent a size (i.e., a capacity) of the buffer, i.e., the overall maximum number of bits that can be stored in the buffer. The "fullness" of the buffer (also referred to as buffer fullness (BF)) may be calculated as shown in Equation 1 below. BF represents a percentage of the capacity of a buffer being used for storage of bits at a particular point in time.

$$BF=((BufferCurrentSize*100)/BufferMaxSize) \quad \text{(Equation 1)}$$

or, using:

$$BF=(((BufferCurrentSize*100)+(BufferMaxSize>>1))/BufferMaxSize) \quad \text{(Equation 2)}$$

However, in certain embodiments, it is desirable for the number of bits contained (i.e., stored) in a buffer at the end of a slice of video data, i.e., after coding all the blocks in the slice to be smaller than BufferMaxSize. Let a variable maxBufferBitsAtSliceEnd represent a desired maximum number of bits in the buffer at the end of the slice. In an example, to prevent underflow and/or overflow, it may be optimal for the number of bits in a buffer at the end of a slice to equal maxBufferBitsAtSliceEnd, which may be less than BufferMaxSize. In such embodiments, maxBufferBitsAtSliceEnd would be used in place of BufferMaxSize in calculating BF at the end of a slice, and equations 1 and/or 2 described above would not be optimal.

In such embodiments, it is desired to adjust the BF depending on (i.e., based on) a coding position of a given block within a slice. More precisely, BF is linearly decreased at a constant rate after coding some fixed number (i.e., a predetermined or configurable number) of blocks in a slice, in such a way that at the end of the slice, BF is 100% if BufferCurrentSize=maxBufferBitsAtSliceEnd.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. Also, the techniques described in this disclosure may become part of standards developed in the future. In other words, the techniques described in this disclosure may be applicable to previously developed video coding standards, video coding standards currently under development, and forthcoming video coding standards.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
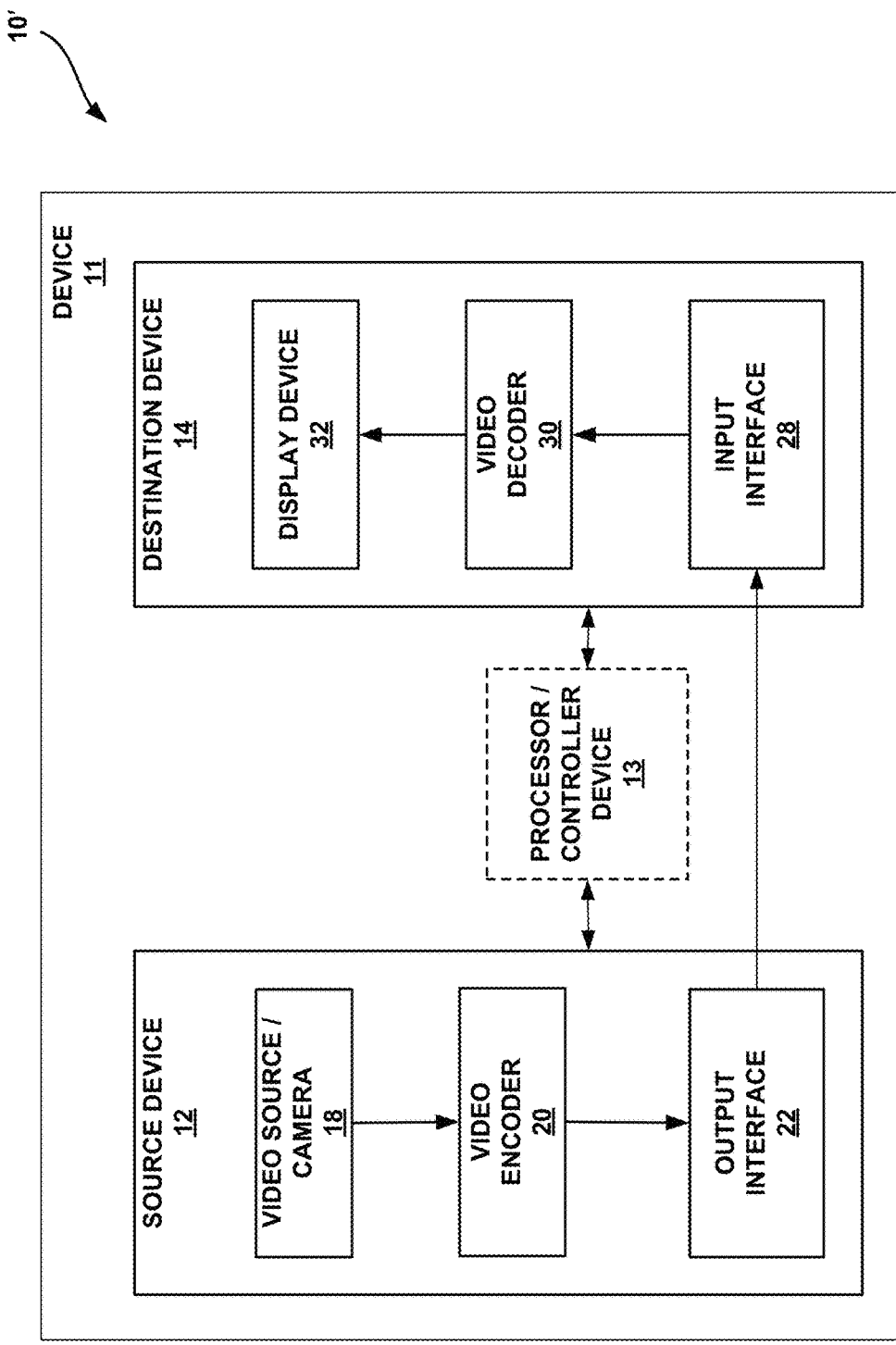
FIG. 1B is a block diagram illustrating another example video encoding and decoding system that may perform techniques in accordance with aspects described in this disclosure.

As shown in FIG. 1A, video coding system 10 includes a source device 12 (i.e., "video coding device 12" or "coding device 12") that generates encoded video data to be decoded at a later time by a destination device 14 (i.e., "video coding device 14" or "coding device 14"). In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices (also referred to as video coding devices) including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for (i.e., configured to communicate via) wireless communication.

The video coding devices 12, 14 of the video coding system 10 may be on configured to communicate via wireless networks and radio technologies, such as wireless wide area network (WWAN) (e.g., cellular) and/or wireless local area network (WLAN) carriers. The terms "network" and "system" are often used interchangeably. Each of the video coding devices 12, 14 may be a user equipment (UE), a wireless device, a terminal, a mobile station, a subscriber unit, etc.

The WWAN carriers may include, for example, wireless communication networks such as Code Division Multiple Access (CDMA), Time Division Multiple Access (TDMA), Frequency Division Multiple Access (FDMA), Orthogonal FDMA (OFDMA), Single-Carrier FDMA (SC-FDMA) and other networks. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2).

The video coding devices 12, 14 of the video coding system 10 may also communicate with each over via a WLAN base station according to one or more standards, such as the IEEE 802.11 standard, including, for example these amendments: 802.11a-1999 (commonly called "802.11a"), 802.11b-1999 (commonly called "802.11b"), 802.11g-2003 (commonly called "802.11g"), and so on.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data (e.g., video coding layer (VCL) data and/or non-VCL data), the video encoder 20 may generate a bitstream. The bitstream may include a sequence of bits that form a coded representation of the video data. The bitstream may include coded pictures and associated data. A coded picture is a coded representation of a picture. VCL data may include coded picture data (i.e., information associated with samples of a coded picture(s)) and non-VCL data may include control information (e.g., parameter sets and/or supplemental enhancement information) associated with the one or more coded pictures.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a quantization parameter (QP). To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the number of bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
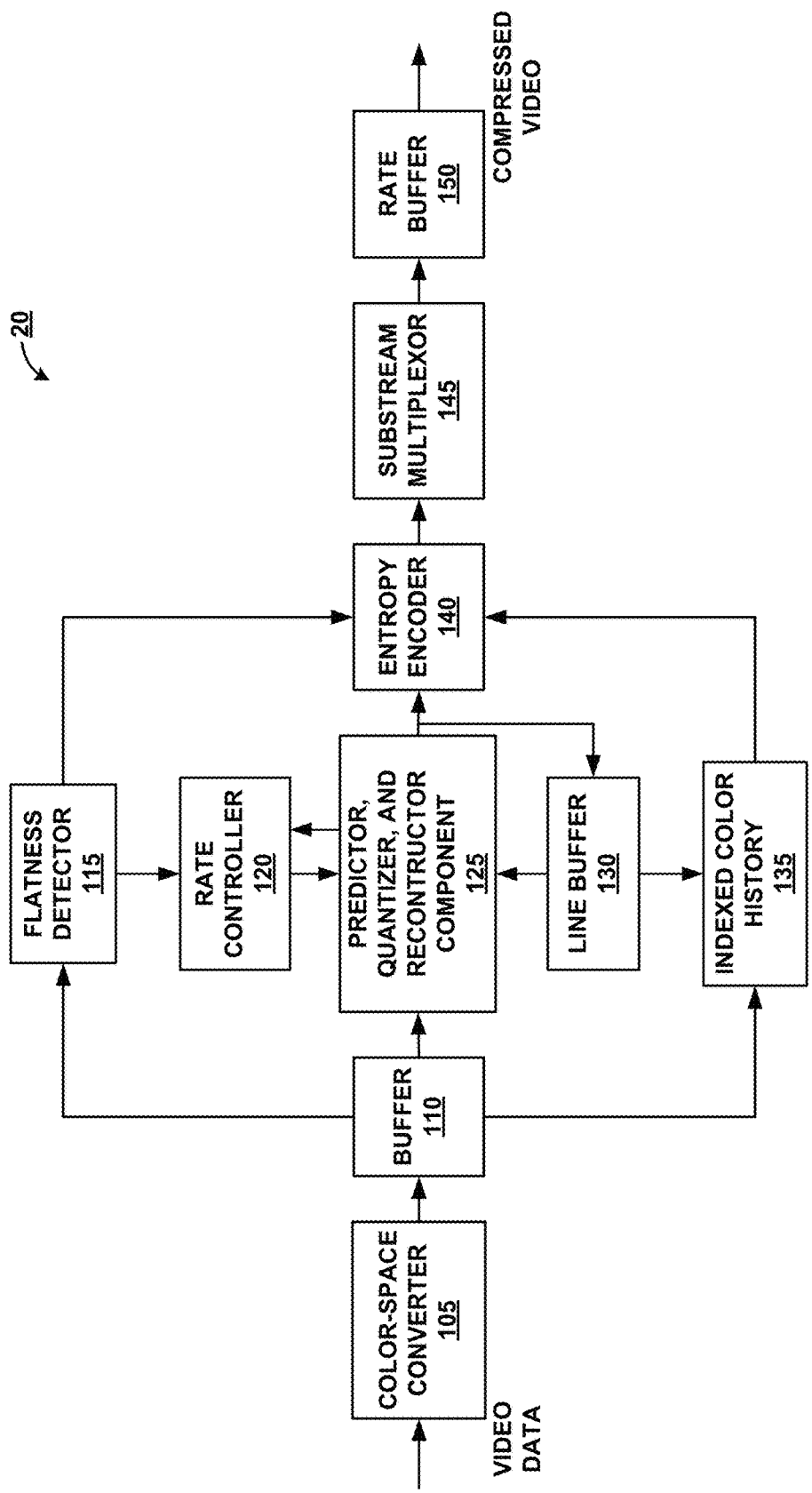
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer, 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space 105 converter may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a CBR buffer model is employed in which bits are taken out from the buffer at a CBR. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a CBR, and the video decoder 30 may remove variable numbers of bits for each block. To ensure proper decoding, the rate buffer 155 of the video decoder 30 should not "underflow" or "overflow" during the decoding of the compressed bit stream.

As discussed above, the BF can be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated according to Equations 1 or 2 above, but further methods for calculating BF are described below.

The flatness detector 115 can detect changes from complex (i.e., non-flat) areas in the video data to flat (i.e., simple or uniform) areas in the video data. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions between complex and flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified.

The rate controller 120 determines a set of coding parameters, e.g., a QP. The QP may be adjusted by the rate controller 120 based on the BF of the rate buffer 150 and image activity of the video data in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that the distortion satisfies the bit-rate constraint, i.e., the overall actual coding rate fits within the target bit rate.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
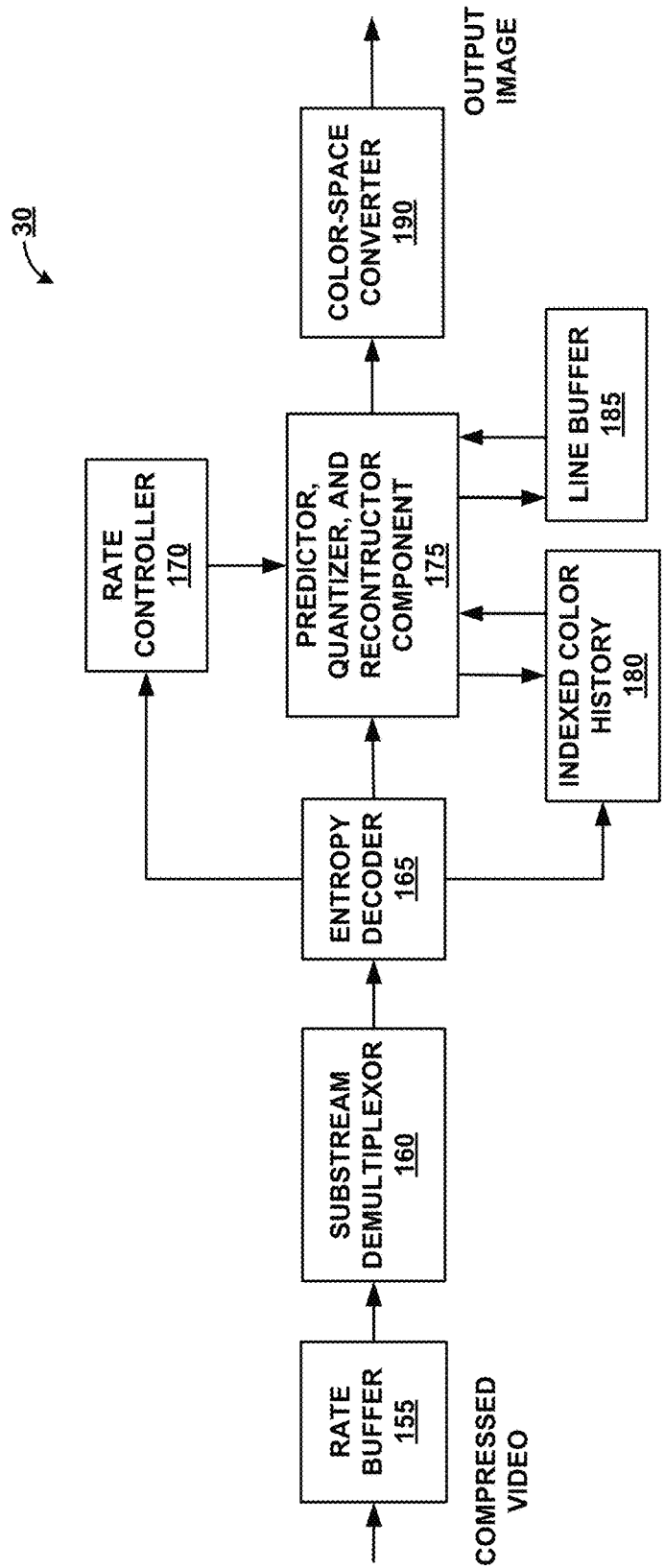
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video decoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

Slices in DSC

As noted above, a slice generally refers to a spatially distinct region in an image or a frame that can be decoded independently without using the information from the rest of the regions in the image or frame. Each image or video frame may be encoded in a single slice or each image or video frame may be encoded in several slices. In DSC, the number of bits allocated to encode each slice may be substantially constant. A slice may be composed of multiple blocks.

Rate Control Buffer

Figure 3:
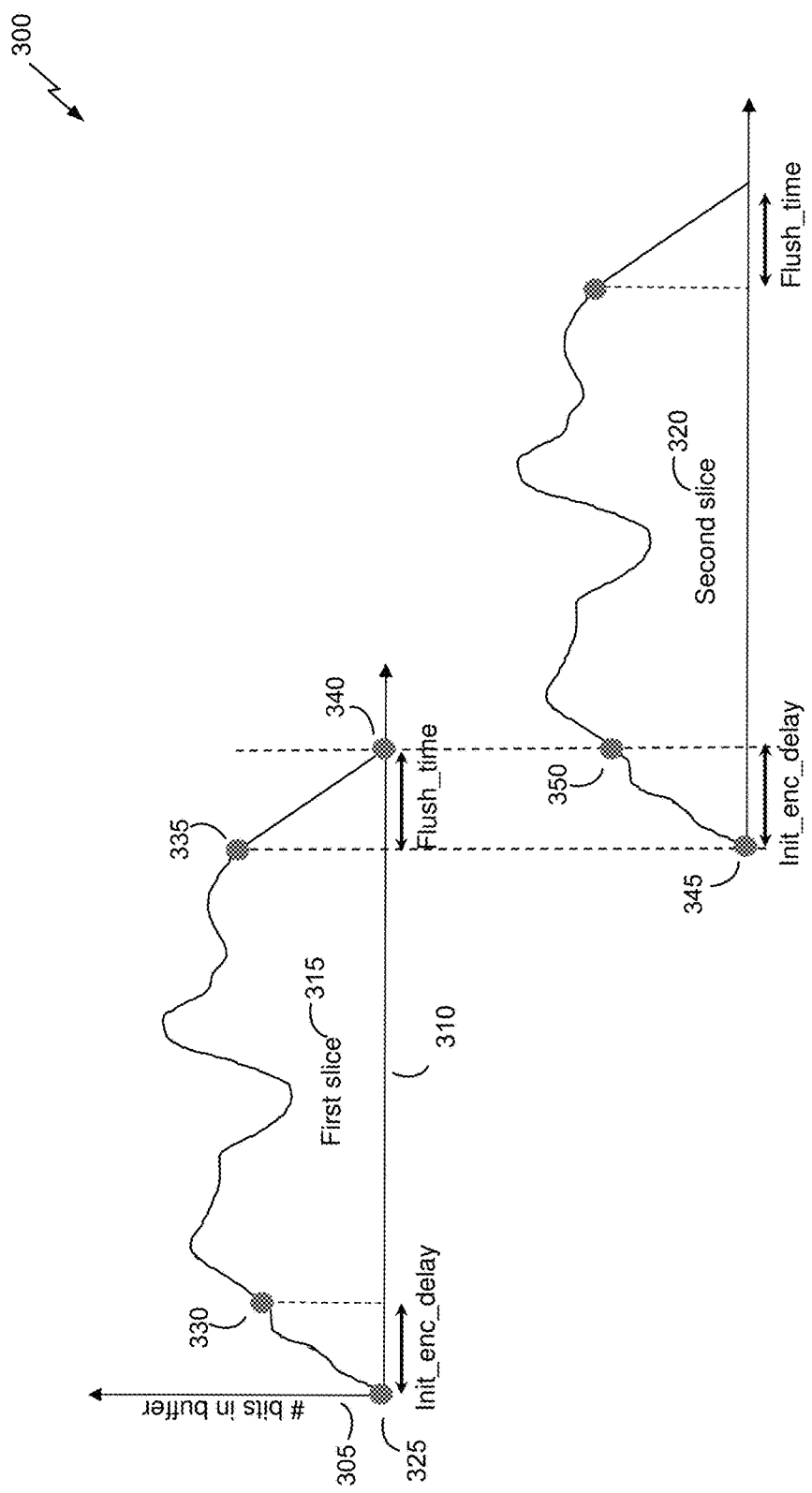
FIG. 3 is a graph showing an exemplary process for encoding slices of data.

FIG. 3 is a graph showing an exemplary process for encoding slices of data. With reference to FIG. 3, vertical axis 305 represents a number of bits currently stored in the rate buffer (e.g., the rate buffer 150 on the video encoder 20 in FIG. 2A, or the rate buffer 155 of the video decoder 30 in FIG. 2B) and horizontal axis 310 represents time. FIG. 3 shows an encoding of a first slice 315 of video data and a second slice 320 of video data. The second slice 320 is illustrated as being positioned below the first slice 315 merely to show an overlap in time that occurs during encoding of the first slice 315 and encoding of the second slice 320 and is not intended to indicate that the number of bits in the second slice 320 is less than the number of bits in the first slice 315.

For illustrative purposes, aspects of the present disclosure will be described with reference to the rate buffer 150 of the video encoder 20 in FIG. 2A; however, it will be understood such aspects are also applicable to the video decoder 30 of FIG. 2B or component(s) thereof, including but not limited to the rate buffer 155.

It is noted that the rate buffer 150 may be able to hold (i.e., store) only a finite number of bits. As discussed above, a variable BufferMaxSize may represent an overall capacity of the rate buffer. However, in order to prevent underflow and/or overflow at the rate buffer 150, it is advantageous to limit the rate buffer 150 to a lower number of bits than BufferMaxSize. As such, temporary maximum bit levels (represented by variables tempBufferMaxSize and maxBufferBitsAtSliceEnd) may be defined for the rate buffer 150 to reflect a desired capacity of the rate buffer 150.

At 325, encoding of the first slice 315 begins. During encoding, bits may be stored in the rate buffer 150 and bits previously stored to the rate buffer 150 may be removed from the rate buffer 150. For example, bits removed from the rate buffer 150 may be transmitted (e.g., by the source device 12, over the link 16). As such, due to the operations of storing bits to and/or removing bits from the rate buffer 150, the total number of bits in the rate buffer 150 may increase and/or decrease at various points of time. In some instances, bits may be grouped together for encoding, transmission, etc. For example, bits may be transmitted as pixels (e.g., six bits per pixel) or blocks (e.g., 96 bits per block for a 2×8 block size with 6 bits per pixel).

At 330, transmission of stored bits begins. Transmission may begin after a delay an initial encoding delay period, indicated in FIG. 3 as Init_enc_delay. The Init_enc_delay may be measured in blocks or pixels and may be a chosen and/or fixed value or may be calculated for each slice. In an embodiment, Init_enc_delay may be based on maxBufferBitsAtSliceEnd. For example, if maxBufferBitsAtSliceEnd is 4128 and Init_enc_delay is measured in blocks, Init_enc_delay may be 4128 divided by the target number of bits per block (e.g., 96). This may be done so that the buffer 150 can transmit remaining blocks from the first slice 315 after the first slice 315 has been completely decoded.

With continued reference to FIG. 3, at 335, encoding of the first slice 315 may be completed. That is, at 335, the number of bits in the buffer 150 should be equal to maxBufferBitsAtSliceEnd. For example, if maxBufferBitsAtSliceEnd is 4128, the number of bits in the buffer 150 should equal 4128 at event 335, when the encoding of the first slice 315 is complete. At 340, transmission of the first slice 315 is complete. As shown in FIG. 3, the end of encoding 335 for the first slice 315 may correspond to the start of encoding for the second slice 320, while the end of transmission 340 for the first slice 315 corresponds to the start of transmission 350 for the second slice 320. Init_enc_delay can be selected to align the ending events (e.g., end of encoding and transmission) of the first slice 315 with the beginning events (e.g., beginning of encoding and transmission) of the second slice 320. That is, the Init_enc_delay period for the second slice 320 may correspond to the flush period, Flush_time, for the first slice 315.

In an embodiment, bits may be removed from the buffer 150 at a constant rate after Init_enc_delay. By doing so, it can be ensured that the number of bits in the buffer 150 at the end of the slice is equal to maxBufferBitsAtSliceEnd. Moreover, bits may be removed from the buffer 150 at a constant rate during the Flush_time. The compressed blocks from the second slice 320 are removed from the buffer 150 after the Init_enc_delay period for the second slice 320 ends.

BF Calculation

Figure 4:
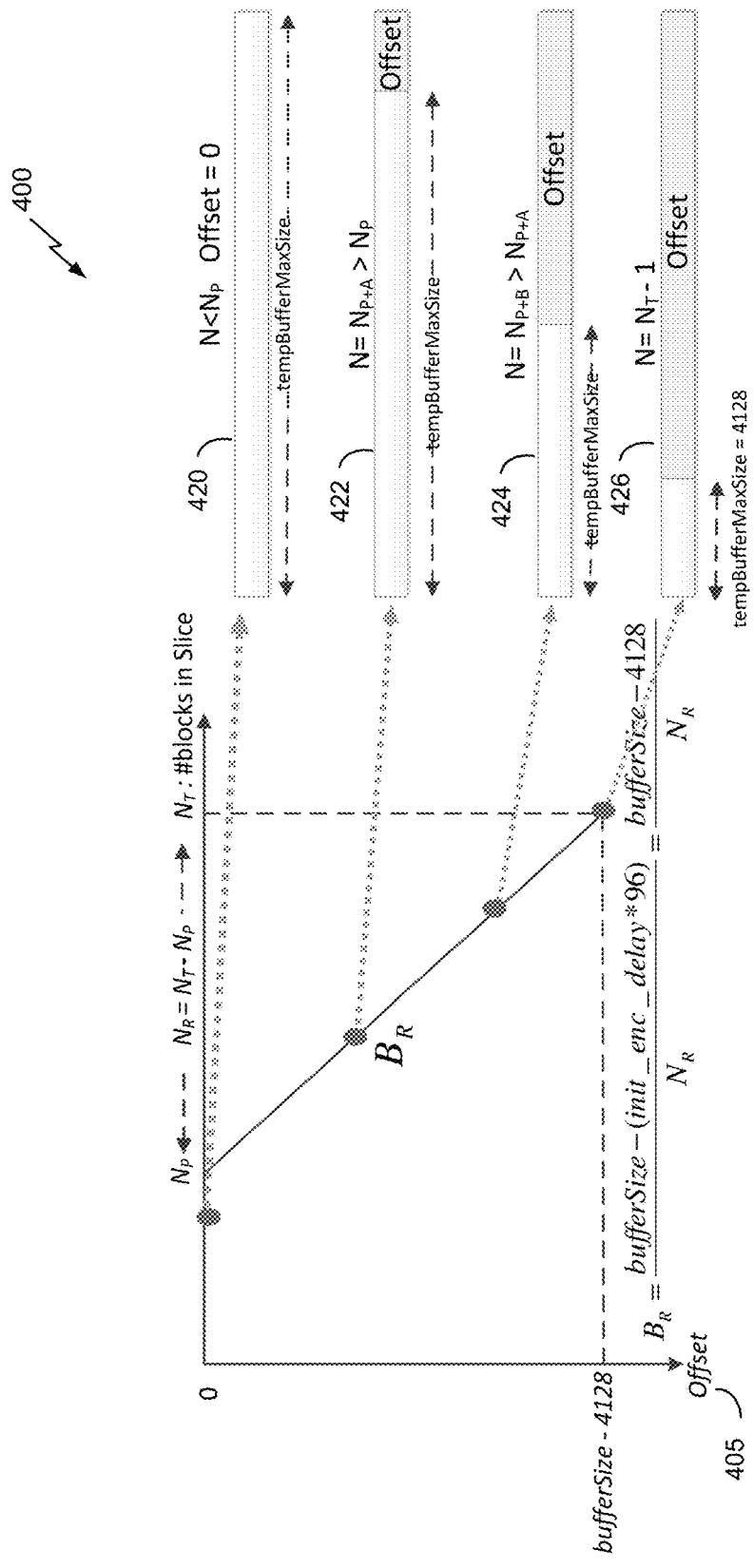
FIG. 4 illustrates an exemplary technique for adjusting buffer fullness (BF) during encoding of a slice.

Given that maxBufferBitsAtSliceEnd is less than BufferMaxSize, it is advantageous to adjust BF calculations based on how much of a slice has been encoded. FIG. 4 illustrates an exemplary method for adjusting BF during coding of a slice. For illustrative purposes, FIG. 4 will be described with reference to the rate buffer 150 of the video encoder 20 in FIG. 2A; however, it will be understood the components of FIG. 4 are also applicable to the video decoder 30 of FIG. 2B or component(s) thereof, including but not limited to the rate buffer 155.

In order to calculate BF, a variable, tempBufferMaxSize, may be defined, which is indicative of the temporary maximum number of bits for the buffer 150 at a specific point of a slice. For example, at the end of a slice, tempBufferMaxSize is equal to maxBufferBitsAtSliceEnd. Yet another variable, Offset, is indicative of how much of BufferMaxSize is unavailable at a given point in time.

The graph in FIG. 4 shows Offset 405 along its vertical axis and the position (i.e., number) of each block in the slice along its horizontal axis. Because blocks may be coded in order, the position of each individual block may be equivalent to the number of blocks coded (hereinafter, numBlocksCoded). For example, the value of numBlocksCoded may range from 0 to the total number of blocks in the slice, denoted $N_T$ (i.e., #blocksInSlice). In an embodiment, a number of blocks, denoted $N_P$, may be coded before BF is adjusted. That is, while numBlocksCoded is less than or equal to $N_P$, Offset 405 is equal to zero and tempBufferMaxSize is equal to BufferMaxSize, as indicated at 420. In an embodiment, $N_P$ may provide a threshold position, such that blocks having a position at or below $N_P$ may have a tempBufferMaxSize equal to BufferMaxSize, while blocks having a position above $N_P$ may have a tempBufferMaxSize that is less than BufferMaxSize. As shown in FIG. 4, the value of tempBufferMaxSize may decrease linearly with each subsequent block above $N_P$. That is, a block having a position after $N_P$ may have a unique respective tempBufferMaxSize that is larger than the tempBufferMaxSize of any subsequent blocks in the slice. In other words, blocks having a position after $N_P$ may have a tempBufferMaxSize that equals an adjustable value that decrements for each block between $N_P$ and and $N_T$, as illustrated in FIG. 4.

With continued reference to FIG. 4, the total number of blocks in an exemplary slice is denoted as $N_T$. Thus, when numBlocksCoded is equal to $N_T$, tempBufferMaxSize should be equal to the maxBufferBitsAtSliceEnd; stated another way, Offset 405 should be equal to MaxBufferSize minus maxBufferBitsAtSliceEnd. For example, if maxBufferBitsAtSliceEnd is 4128, tempBufferMaxSize should equal 4128 at $N_T$ and Offset 405 should equal MaxBufferSize minus 4128, as indicated at 426.

In order to achieve this, tempBufferMaxSize and Offset 405 can be adjusted at a constant rate, denoted $B_R$, between numBlocksCoded=$N_P$ and numBlocksCoded=$N_T$. The difference between $N_P$ and $N_T$ is denoted as $N_R$ in FIG. 3. $B_R$ forms a line between the points (numBlocksCoded=$N_P$, Offset=0) and (numBlocksCoded=$N_T$, Offset=bufferMaxSize minus maxBufferBitsAtSliceEnd). For example, if maxBufferBitsAtSliceEnd is 4128, $B_R$ can be defined as (maxBufferSize–4128)/$N_R$. Values of Offset 405 and tempBufferMaxSize for exemplary points along $B_R$ are illustrated at 422 and 424.

In this way, points along $B_R$ can provide a corresponding tempBufferMaxSize for individual blocks of a slice. The corresponding tempBufferMaxSize may then be used to calculate an individual BF for each block in the slice. In an embodiment, blocks in a slice may be defined based their positions within the slice.

In an embodiment, Equations 1 and 2, above, can be used to calculate BF for blocks within a slice that are positioned at or below $N_P$. For example, for $N_P$ equal to 2, BF may be calculated according to Equations 1 and 2 for the first and second blocks. For any remaining blocks, BF may be calculated by substituting tempBufferMaxSize in place of BufferMaxSize in Equation 1 and/or 2. That is, BF may be calculated using:

$$BF=((BufferCurrentSize*100)/tempBufferMaxSize) \quad \text{(Equation 3)}$$

or, using:

$$BF=(((BufferCurrentSize*100)+(tempBufferMaxSize>>1))/tempBufferMaxSize) \quad \text{(Equation 4)}$$

Also, tempBufferMaxSize may be calculated using:

$$tempBufferMaxSize=BufferMaxSize-Offset \quad \text{(Equation 5),}$$

where $$Offset=B_R*(numBlocksCoded-N_P+1) \quad \text{(Equation 6)}$$

and where $$B_R=(BufferMaxSize-tempBufferMaxSize)/(numBlocksCoded-N_P) \quad \text{(Equation 7)}$$

To summarize, the following exemplary code may be used in calculating BF:

```
numBlocksCoded = 0; tempBufferMaxSize = BufferMaxSize;
BR = (BufferMaxSize - maxBufferBitsAtSliceEnd) / (NT - NP);
for i = 1: NT
{
    code i^th block
    numBlocksCoded += 1;
    if(numBlocksCoded >= N_P)
{
tempBufferMaxSize = BufferMaxSize - (B_R * (numBlocksCoded - N_P +
1));
}
        calculate BF
}
```

Example Flowchart for Providing CBR

Figure 5:
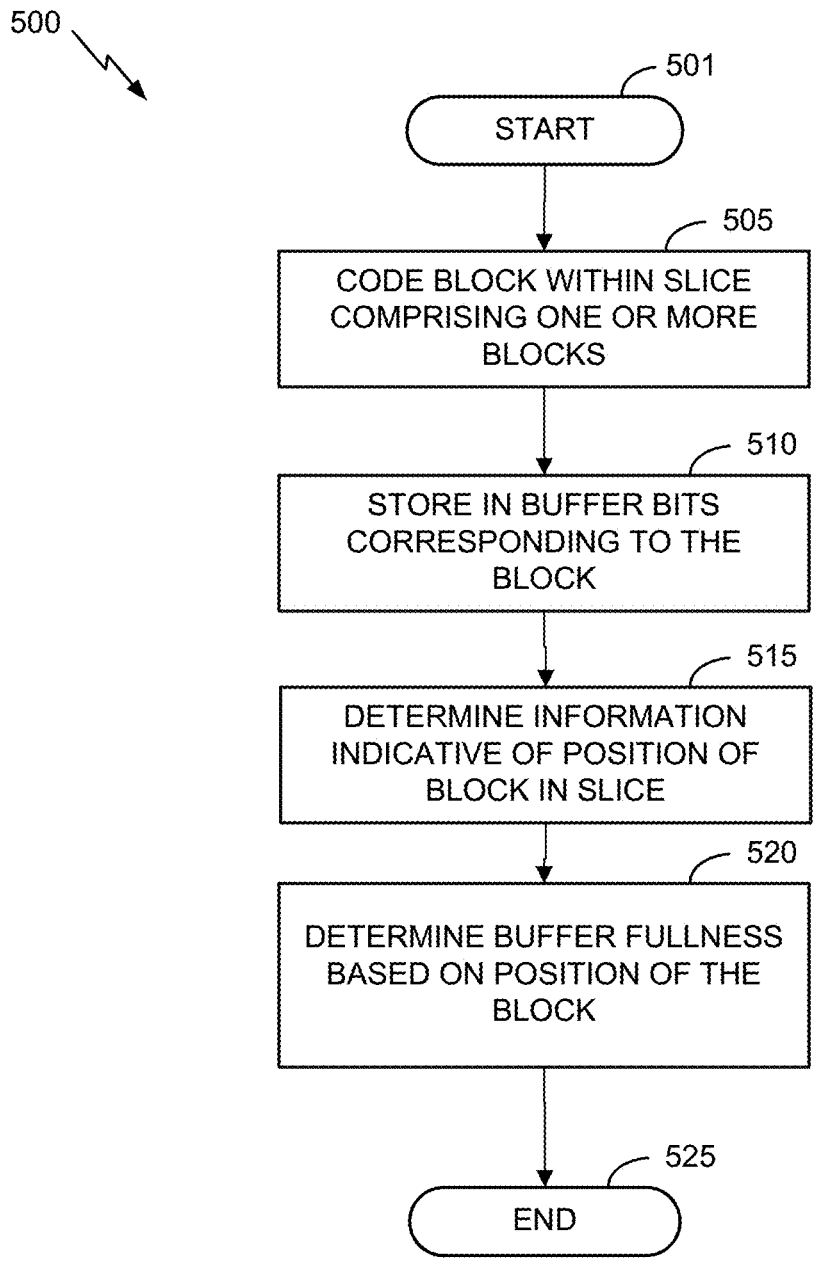
FIG. 5 is a flowchart illustrating an example method for providing constant bit rate (CBR) output at a buffer.

With reference to FIG. 5, an example procedure for determining buffer fullness at a buffer (e.g., the rate buffer 150 on the video encoder 20 in FIG. 2A, or the rate buffer 155 of the video decoder 30 in FIG. 2B) will be described. For illustrative purposes, steps of FIG. 5 will be described with reference to the rate buffer 150 of the video encoder 20 in FIG. 2A. However, the steps illustrated in FIG. 5 may be performed by a video encoder (e.g., the video encoder 20 in FIG. 2A), a video decoder (e.g., the video decoder 30 in FIG. 2B), or component(s) thereof. For convenience, method 500 is described as performed by a video coder (also simply referred to as coder), which may be the video encoder 20, the video decoder 30, or another component.

The method 500 begins at block 501. At block 505, the process 500 may involve coding a block of data within a slice of data. In an embodiment, coding may be performed by a processor. As described above, a slice can be any spatially distinct region in an image or a frame that can be decoded independently without using the information from the rest of the regions in the image or frame. The slice may be composed of one or more blocks and/or pixels.

At block 510, the process 500 may involve storing one or more bits corresponding to the block in a rate buffer 150. For example, blocks may be compressed and the corresponding bits may be temporarily stored in the rate buffer 150. In an embodiment, individual bits may be added to the buffer 150 after being coded. In an alternative embodiment, multiple bits may be added to the buffer 150 simultaneously.

At block 515, the process 500 may involve determining information indicative of a position of the one or more blocks relative other blocks in the slice. For example, it may be determined that a given block is a third coded block, and such a block may be defined as the third block of the slice. By determining the position of the block, the number of previously coded blocks in the slice and/or the number of blocks in the slice yet to be coded can be determined. In an embodiment, determining information indicative of the position may be performed by a processor.

At block 520, the process 500 may involve determining BF at one or more block positions. This determination may be used for rate control. For example, with reference to FIG. 4, the positioning of a block may indicate the point along $B_R$ that is associated with the block. In order to determine this, it may be necessary to know maxBufferBitsAtSliceEnd, which may be used in calculating $B_R$. The associated position along $B_R$ may indicate the corresponding tempBufferMaxSize for the block. Then, BF may be calculated by dividing BufferCurrentSize by the tempBufferMaxSize for the block. In an embodiment, determining BF may be performed by a processor. The process 500 ends at block 525.

In an embodiment, tempBufferMaxSize may be adjusted by an integer value, c. For example, tempBufferMaxSize may be calculated using:

$$\text{tempBufferMaxSize} = \text{BufferMaxSize} - (B_R * (\text{numBlocksCoded} - N_P + c)) \quad \text{(Equation 8)}$$

In one example, c may be equal to 0, 1, −1, or any other integer value. In another embodiment, $B_R$ may be adjusted by an integer value, d. For example, $B_R$ may be calculated using:

$$B_R = (\text{BufferMaxSize} - \text{maxBufferBitsAtSliceEnd})/(N_T - N_P + d) \quad \text{(Equation 9)}$$

where d may be equal to 0, 1, −1, or any other integer value. Similar adjustments to the other variables of the above equations may also be made.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method of display link video compression, comprising:
   coding a block within a slice of video data, the slice comprising one or more blocks of the video data;
   storing bits corresponding to the block in a buffer;
   determining information indicative of a position of the block within the slice;
   determining fullness of the buffer based at least in part on the position of the block within the slice:, and
   determining a threshold position within the slice, wherein each block coded at a first position prior to reaching the threshold position has a temporary maximum buffer size that equals a first value and each block coded at a second position after reaching the threshold position has a temporary maximum buffer size that equals an adjustable value, the adjustable value being Jess than the first value.

2. The method of claim 1, further comprising determining a number of bits stored in the buffer, wherein determining fullness of the buffer is further based at least in part on the determined number of bits stored in the buffer.

3. The method of claim 2, wherein the temporary maximum buffer size is indicative of a desired maximum number of bits that can be stored in the buffer for the position of the block, and wherein determining fullness of the buffer comprises dividing the number of bits stored in the buffer by the temporary maximum buffer size.

4. The method of claim 1, further comprising determining a maximum capacity of the buffer and a desired maximum number of bits to be stored in the buffer after the slice is completely coded.

5. The method of claim 4, wherein the first value is equal to the maximum capacity of the buffer.

6. The method of claim 5, further comprising, based on the desired maximum number of bits to be stored in the buffer after the slice is completely coded, decrementing the adjustable value for each block coded at the second position after reaching the threshold position.

7. The method of claim 1, wherein determining the information indicative of the position of the block within the slice comprises determining a number of blocks in the slice that have been coded.

8. An apparatus for display link video compression, comprising:
   a processor configured to code a block within a slice of video data, the slice comprising one or more blocks of the video data;
   a buffer coupled to the processor and configured to store bits corresponding to the block,
   wherein the processor is further configured to:
      determine information indicative of a position of the block within the slice and determine fullness of the buffer based at least in part on the position of the block within the slice, and
      determine a threshold position within the slice, wherein each block coded at a first position prior to reaching the threshold position has a temporary maximum buffer size that equals a first value and each block coded at a second position after reaching the threshold position has a temporary maximum buffer size that equals an adjustable value, the adjustable value being less than the first value.

9. The apparatus of claim 8, wherein the processor is further configured to determine a number of bits stored in the buffer, wherein determining fullness of the buffer is further based at least in part on the determined number of bits stored in the buffer.

10. The apparatus of claim 9, wherein the temporary maximum buffer size is indicative of a desired maximum number of bits that can be stored in the buffer for the position of the block, and wherein determining fullness of the buffer comprises dividing the number of bits stored in the buffer by the temporary maximum buffer size.

11. The apparatus of claim 8, wherein the processor is further configured to determine a maximum capacity of the buffer and a desired maximum number of bits to be stored in the buffer after the slice is completely coded.

12. The apparatus of claim 11, wherein the first value is equal to the maximum opacity of the buffer.

13. The apparatus of claim 12, wherein the processor is further configured to, based on the desired maximum number of bits to be stored in the buffer after the slice is completely coded, decrement the adjustable value for each block coded at the second position after reaching the threshold position.

14. The apparatus of claim 13, wherein determining the information indicative of the position of the block within the slice comprises determining a number of blocks in the slice that have been coded.

15. A non-transitory computer readable storage medium having stored thereon instructions that, when executed, cause a processor of a device to:
code a block within a slice of video data, the slice comprising one or more blocks of the video data;
store bits corresponding to the block in a buffer;
determine information indicative of a position of the block within the slice;
determine fullness of the buffer based at least in part on the position of the block within the slice; and
determine a threshold position within the slice, wherein each block coded at a first position prior to reaching the threshold position has a temporary maximum buffer size that equals a first value and each block coded at a second position after reaching the threshold position has a temporary maximum buffer size that equals an adjustable value, the adjustable value being less than the first value.

16. The non-transitory computer readable storage medium of claim 15, further having stored thereon instructions that, when executed, cause the processor to determine a number of bits stored in the buffer, wherein determining fullness of the buffer is further based at least in part on the determined number of bits stored in the buffer.

17. The non-transitory computer readable storage medium of claim 16, wherein the temporary maximum buffer size is indicative of a desired maximum number of bits that can be stored in the buffer for the position of the block, and wherein determining fullness of the buffer comprises dividing the number of bits stored in the buffer by the temporary maximum buffer size.

18. The non-transitory computer readable storage medium of claim 15, further having stored thereon instructions that, when executed, cause the processor to determine a maximum capacity of the buffer and a desired maximum number of bits to be stored in the buffer after the slice is completely coded.

19. The non-transitory computer readable storage medium of claim 18, wherein the first value is equal to the maximum capacity of the buffer.

20. The non-transitory computer readable storage medium of claim 19, further having stored thereon instructions that, when executed, cause the processor to, based on the desired maximum number of bits to be stored in the buffer after the slice is completely coded, decrement the adjustable value for each block coded at the second position after reaching the threshold position.

21. A video coding device, comprising:
means for coding a block within a slice of video data, the slice comprising one or more blocks of the video data;
means for storing bits corresponding to the block in a buffer;
means for determining information indicative of a position of the block within the slice;
means for determining fullness of the buffer based at least in part on the position of the block within the slice; and
means for determining a threshold position within the slice, wherein each block coded at a first position prior to reaching the threshold position a temporary maximum buffer size that equals a first value and each block coded at a second position after reaching the threshold position has a temporary maximum buffer size that equals an adjustable value, the adjustable value being less than the first value.

22. The video coding device of claim 21, further comprising means for determining a number of bits stored in the buffer, wherein determining fullness of the buffer is further based at least in part on the determined number of bits stored in the buffer.

23. The video coding device of claim 22, wherein the temporary maximum buffer size is indicative of a desired maximum number of bits that can be stored in the buffer for the position of the block, and wherein determining fullness of the buffer comprises dividing the number of bits stored in the buffer by the temporary maximum buffer size.

24. The video coding device of claim 21, further comprising means for determining a maximum capacity of the buffer and a desired maximum number of bits to be stored in the buffer after the slice is completely coded.

25. The video coding device of claim 24, wherein the first value is equal to the maximum capacity of the buffer.

26. The video coding device of claim 25, further comprising means for decrementing the adjustable value for each block coded at the second position after reaching the threshold position based on the desired maximum number of bits to be stored in the buffer after the slice is completely coded.

* * * * *